United States Patent [19]

Yamaguchi et al.

[11] Patent Number: 4,546,038

[45] Date of Patent: Oct. 8, 1985

[54] MAGNETIC RECORDING MEDIUM

[75] Inventors: Nobutaka Yamaguchi; Masaaki Fujiyama; Katsumi Ryoke; Eiichi Tadokoro, all of Kanagawa, Japan

[73] Assignee: Fuji Photo Film Company, Limited, Japan

[21] Appl. No.: 489,908

[22] Filed: Apr. 29, 1983

[30] Foreign Application Priority Data

Apr. 30, 1982 [JP] Japan ................. 57-72914

[51] Int. Cl.$^4$ ................................ B32B 5/16
[52] U.S. Cl. ................ 428/323; 252/62.54; 428/329; 428/694; 428/695; 428/900
[58] Field of Search ........... 428/694, 695, 692, 323, 428/329, 900; 252/62.54

[56] References Cited

U.S. PATENT DOCUMENTS

| | | | |
|---|---|---|---|
| 3,423,233 | 1/1969 | Akashi et al. | 428/900 |
| 4,015,042 | 3/1977 | Chassaigne | 428/900 |
| 4,135,031 | 1/1979 | Akashi et al. | 428/323 |
| 4,275,113 | 6/1981 | Saito et al. | 428/900 |
| 4,320,159 | 3/1982 | Ogawa et al. | 428/695 |
| 4,388,369 | 6/1983 | Tamai et al. | 428/900 |
| 4,474,843 | 10/1984 | Miyoshi et al. | 428/323 |

FOREIGN PATENT DOCUMENTS

| | | | |
|---|---|---|---|
| 134406 | 11/1978 | Japan | 428/328 |
| 54-9041 | 4/1979 | Japan . | |

Primary Examiner—George F. Lesmes
Assistant Examiner—William M. Atkinson
Attorney, Agent, or Firm—Sughrue, Mion, Zinn, Macpeak and Seas

[57] ABSTRACT

A magnetic recording medium is disclosed which is comprised of a non-magnetic support having a magnetic layer provided thereon. The magnetic layer is comprised of two different types of carbon black having different particle sizes, a lubricant which is liquid at room temperature, a ferromagnetic powder all dispersed in a binder. A carbon black (1) has an average particle size smaller than 50 m$\mu$ and a carbon black (2) has an average particle size of larger than 120 m$\mu$. The carbon black is present in a weight ratio of (1)/(2) within the range of 50/50 to 97/3. The magnetic recording medium has improved electromagnetic properties and running durability. In addition, the material provides an improved S/N ratio and an improved coefficient of friction.

17 Claims, No Drawings

MAGNETIC RECORDING MEDIUM

FIELD OF THE INVENTION

This invention relates to improvements with regard to the electromagnetic properties and a running durability of magnetic recording medium.

BACKGROUND OF THE INVENTION

Carbon black has been incorporated into a magnetic layer to improve the antistatic properties of a magnetic recording medium. Where a single kind of a carbon black does not provide sufficient antistatic properties, a mixture of carbon black having an average particle size of 10 to 30 m$\mu$ and carbon black having an average particle size of 60 to 120 m$\mu$ has been used (Japanese Patent Publication No. 9041/79). However, the above method was not satisfactory to obtain good electromagnetic properties and good running properties with video recording tapes used for high density and short wave length recording such as VHS type and $\beta$ type video tapes.

SUMMARY OF THE INVENTION

The primary object of this invention is to provide a magnetic recording medium having improved electromagnetic properties and running durability. The another object of this invention is to provide a magnetic recording medium having an improved video S/N ratio and an improved coefficient of friction.

After thorough investigation, the inventors of this invention have found that the above objects can be attained by incorporating a carbon black having an average primary particle size of smaller than 50 m$\mu$, a carbon black having an average primary particle size of larger than 120 m$\mu$ in a mixing weight ratio of 50/50 to 97/3 and a liquid lubricant at a normal temperature in a magnetic recording layer which is provided on a nonmagnetic support.

DETAILED DESCRIPTION OF THE INVENTION

Ferromagnetic particles which are contained in the magnetic layer of this invention include oxide powders such as $\gamma$-Fe$_2$O$_3$, FeOx (1.33<x<1.5), Co-containing $\gamma$-Fe$_2$O$_3$, Co-containing FeOx (1.33<x<1.5), CrO$_2$, plate-like Ba ferrite or alloy powders such as Fe-Ni, Fe-Ni-Co or Fe-Zn. The magnetic particles preferably have a surface area measured by BET method (a BET one point method according to a nitrogen-adsorption method: BET measuring device made by Quantachrome Co.) of not smaller than 30 m$^2$/g, more preferably not smaller than 35 m$^2$/g. The fine ferromagnetic particles can be surface-treated by a surface active agent to obtain better results with the present invention. Otherwise, the particles can be kneaded with a binder by a kneader such as a three roll mill, an open kneader or a kneader equipped with a pressing device to sufficiently disperse the ferromagnetic fine particles.

The average primary particle size of the fine carbon black used in this invention is smaller than 50 m$\mu$, preferably 5 to 35 m$\mu$ and more preferably 10 to 30 m$\mu$. The specific examples of the fine carbon black are "Neospectra Mark I" (8 m$\mu$), manufactured by Columbian Carbon, "Conductex SC" (17 m$\mu$), and #80 (23 m$\mu$) and #60H (35 m$\mu$) manufactured by Asahi Carbon.

The average primary particle size of the coarse carbon black used in this invention is larger than 120 m$\mu$, preferably larger than 150 m$\mu$ and more preferably 200 to 1000 m$\mu$. The specific example is "Raven MT-P" (330 m$\mu$) manufactured by Columbian Carbon.

A mixing weight ratio of the fine particles and the coarse particles of carbon blacks is preferably 50/50 to 97/3, and more preferably 60/40 to 90/10.

The total amount of carbon black is preferably 1 to 20 parts by weight, more preferably 3 to 15 parts by weight, based on 100 parts by weight of ferromagnetic particles.

The fine and coarse particles of carbon black are mixed and then all of them can be put into a dispersing device to prepare a magnetic coating composition. Alternatively, some of them can be put into a dispersing device and then after the dispersing step proceeds to some degree, the rest of them can be put into the dispersing device. It is also possible for the fine carbon black which can not be easily dispersed to be dispersed first and then the coarse carbon black can be added.

Where a carbon black needs to be carefully dispersed, the carbon black is kneaded with a binder and the ferromagnetic particles by a kneader such as a three roll mill, and the mixture is dispersed in a dispersing device to prepare a magnetic coating composition. When electroconductivity is important, carbon black is put in a dispersing device after the dispersion has proceeded half way so that the chain structure is not cut during the preparation of the magnetic coating composition.

The lubricant used in this invention must be in a liquid state at a normal temperature (about 5° to 35° C.). Examples of useful liquid lubricants include silicone oil, liquid paraffin, fatty acid, fatty acid ester or fluorine type oil. This invention should not be limited to those mentioned above, because any lubricant in a liquid state at a normal temperature can be used in this invention. If necesssary, a mixture of lubricants can also be used.

A total amount of the lubricant is preferably 10 to 1000 parts by weight, more preferably 20 to 750 parts by weight and most preferably 50 to 500 parts by weight, based on 100 parts by weight of coarse carbon black.

Other additives may be present in the magnetic layer (for example, a binder, an abrasive, a dispersing agent, a plasticizer, a stabilizing agent, an extending agent or other lubricants). The support on which the magnetic layer is coated may be any support generally used for a magnetic recording medium. For example, these additives and support are disclosed in U.S. Pat. No. 4,135,016 (Japanese Patent Publication No. 26890/81).

Examples of materials found useful in connection with the present invention are illustrated hereinafter.

Useful binders include those commonly used for a magnetic recording medium such as a cellulose derivative (cellulose nitrate, cellulose propionate), vinyl chloride-vinyl acetate resin (vinyl alcohol-containing compound, maleic acid-containing compound), polyurethane, epoxy resin, polyamide, polyisocyanate or polyester. Useful abrasives include $\alpha$-Al$_2$O$_3$, Cr$_2$O$_3$, SiC, and $\alpha$-Fe$_2$O$_3$. A dispersing agent such as lecithin, a plasticizer such as TPP and DBP and a stabilizing agent such as lead stearate can be added if necessary. An inorganic powder such as silica, CaCO$_3$ or tarc can also be added.

Useful supports include polyethylene terephthalate, polyamide, polyethylenenaphthalate, polyimide and triacetylcellulose, and the support may have a back layer.

Useful solvents include those commonly used for magnetic recording tapes. Examples of such solvents include ketones such as methyl ethyl ketone, esters such as ethyl acetate, alcohols such as butyl alcohol, aromatic hydrocarbons such as toluene or chlorine type solvents such as carbon tetrachloride.

Although the present inventors are uncertain with respect to exactly why the present invention produces such improved results, they offer the following possible explanation.

When a coarse carbon black is mixed with a fine carbon black the video S/N is not deteriorated even though the porosity of the magnetic layer changes a great deal that is, the porosity percentage increases. When a liquid lubricant is included in the coating composition of the magnetic layer, a part or most of the lubricant is present in the pores of the magnetic layer. Therefore, although the lubricant is removed from the surface of the magnetic layer after the recording tape is repeatedly run in a video tape recorder (VTR), the lubricant gradually comes out on the surface of the magnetic layer from the inside of the magnetic layer, and a low coefficient of friction can be constantly maintained. If the lubricant is solid at a normal temperature, it is present only on the surface of the magnetic layer and it hardly transfers from the inside of the layer to the outside of the layer. Therefore, the coefficient of friction is markedly increased after the recording tape is repeatedly run in a VTR.

This invention will be further explained in more detail by the following examples. However, the scope of the invention is not limited to these examples. In the compositions, "part" means "part by weight" and is represented by a solid content. (m.p.=melting point).

EXAMPLE 1

| | Parts |
|---|---|
| Ferromagnetic particles (Co-containing $\gamma$-Fe$_2$O$_3$ BET = 35 m$^2$/g) | 100 |
| Vinyl chloride-vinyl acetate copolymer ("S-lec" manufactured by Sekisui Kagaku Kogyo Co., Ltd. | 8 |
| Polyurethane ("N-2301" manufactured by Nihon Polyurethane Co., Ltd.) | 4 |
| Polyisocyanate ("Coronate-L" manufactured by Nihon Polyurethane Co., Ltd.) | 3 |
| Fine carbon black | amount as shown in Table 1 |
| Coarse carbon black | amount as shown in Table 1 |
| Lubricant (oleic acid, m.p. = 16° C.) | 1 |
| Abrasive agent ($\alpha$-Al$_2$O$_3$) | 3 |
| Methyl ethyl ketone | 300 |

The above compositions were mixed with a ball mill to prepare a coating composition. The coating composition was coated on a polyethylene terephthalate film having a thickness of 15$\mu$ in a dry thickness of 5$\mu$ by a doctor method.

The coated layer was treated with a calender and slit to a width of ½ inches to prepare VHS type video tapes (Samples Nos. 1, 7 to 11).

The size and the amount of the carbon black are shown in Table 1.

COMPARATIVE EXAMPLE 1

The same procedure as in Example 1 was repeated except that the size and the amount of carbon black were changed to prepare Samples Nos. 2 to 6 and 12.

COMPARATIVE EXAMPLE 2

| | Parts |
|---|---|
| Ferromagnetic particles (Co-containing $\gamma$-Fe$_2$O$_3$ BET = 20 m$^2$/g) | 100 |
| Abrasive agent (Cr$_2$O$_3$) | 0.9 |
| Vinyl chloride-vinyl acetate resin ("VAGH" manufactured by UCC) | 20 |
| Polyurethane prepolymer ("XL-1007" manufactured by Takeda Chemical Industries) | 13 |
| Lauric acid | 0.5 |
| Liquid paraffin | 0.7 |
| Fine carbon black (25 m$\mu$) | 1.2 |
| Coarse carbon black (90 m$\mu$) | 2.8 |
| Methyl isobutyl ketone | 133 |
| Toluene | 133 |

The above compositions were mixed with a ball mill to prepare a Sample No. 13 by the same procedure as in Example 1.

EXAMPLE 2

The same procedure as in the preparation of Sample No. 1 was repeated except that magnetic particles having the BET surface area as shown in Table 1 was used to provide Samples Nos. 14 to 17.

EXAMPLE 3

The same procedure as in the preparation of Sample No. 1 except that various kinds of lubricants which were liquid at a normal temperature were used instead of oleic acid to provide Samples Nos. 18 to 25.

COMPARATIVE EXAMPLE 3

The same procedure as in the preparation of Sample No. 1 was repeated except that various kinds of lubricants which were solid at a normal temperature were used to provide Samples Nos. 26 to 29.

The results of Samples Nos. 1 to 29 are shown in Table 1.

A VHS type VTR, "NV-3700" manufactured by Matsushita Electric Co., Ltd. was used. The video S/N ratio has been shown as a relative value to a standard video tape. The coefficient of friction ($\mu$) was measured by winding the surface of the magnetic layer around the SUS bar before the tape was used and after the tape made 1500 passes in a VTR. When one end of the sample tape is burdened with 50 g (T$_1$) and placed on a SUS bar and the other end of it was drawn with a strength of T$_2$ so that the sample moves at a relative speed of 2 m/min., the coefficient of friction can be shown by the following formula.

$$\mu = \frac{1}{\theta} \log_e \frac{T_2}{T_1} \text{ (winding angle } \theta = \pi\text{)}$$

The porosity of the magnetic layer was obtained by incorporating mercury in the pores of the magnetic layer under pressure.

TABLE 1

| Sample No. | Examples or Comparative Examples | Fine carbon black Size (mμ) | Fine carbon black Amount (part) | Coarse carbon black Size (mμ) | Coarse carbon black Amount (part) | Surface area of ferromagnetic particle* ($m^2/g$) | Lubricant Kind | Lubricant m.p. (°C.) | Video S/N (dB) | Coefficient of friction before running in VTR | Coefficient of friction after running in VTR | Porosity of magnetic layer (%) |
|---|---|---|---|---|---|---|---|---|---|---|---|---|
| 1 | Example 1 | 25 | 8.5 | 330 | 1.5 | 35 | Oleic acid | 16 | 3.0 | 0.20 | 0.21 | 25 |
| 2 | Comparative Example 1 | 25 | 10 | — | — | 35 | Oleic acid | 16 | 3.2 | 0.33 | 0.5< | 12 |
| 3 | Comparative Example 1 | 50 | 10 | — | — | 35 | Oleic acid | 16 | 2.5 | 0.30 | 0.5< | 10 |
| 4 | Comparative Example 1 | 90 | 10 | — | — | 35 | Oleic acid | 16 | 1.7 | 0.27 | 0.5< | 8 |
| 5 | Comparative Example 1 | — | — | 330 | 10 | 35 | Oleic acid | 16 | 1.3 | 0.22 | 0.5< | 6 |
| 6 | Comparative Example 1 | 25 | 9.9 | 330 | 0.1 | 35 | Oleic acid | 16 | 3.1 | 0.31 | 0.48 | 14 |
| 7 | Example 1 | 25 | 9.7 | 330 | 0.3 | 35 | Oleic acid | 16 | 3.1 | 0.28 | 0.28 | 21 |
| 8 | Example 1 | 25 | 9.5 | 330 | 0.5 | 35 | Oleic acid | 16 | 3.1 | 0.23 | 0.24 | 22 |
| 9 | Example 1 | 25 | 9 | 330 | 1 | 35 | Oleic acid | 16 | 3.1 | 0.21 | 0.21 | 24 |
| 10 | Example 1 | 25 | 7 | 330 | 3 | 35 | Oleic acid | 16 | 3.0 | 0.20 | 0.21 | 25 |
| 11 | Example 1 | 25 | 5 | 330 | 5 | 35 | Oleic acid | 16 | 2.7 | 0.19 | 0.23 | 22 |
| 12 | Comparative Example 1 | 25 | 4 | 330 | 6 | 35 | Oleic acid | 16 | 2.0 | 0.19 | 0.35 | 19 |
| 13 | Comparative Example 2 | 25 | 1.2 | 90 | 2.8 | 20 | Lauric acid / Liquid paraffin | 44 / −18 | −0.5 | 0.29 | 0.5< | 13 |
| 14 | Example 2 | 25 | 8.5 | 330 | 1.5 | 20 | Oleic acid | 16 | 0.5 | 0.18 | 0.23 | 17 |
| 15 | Example 2 | 25 | 8.5 | 330 | 1.5 | 25 | Oleic acid | 16 | 0.9 | 0.19 | 0.25 | 17 |
| 16 | Example 2 | 25 | 8.5 | 330 | 1.5 | 30 | Oleic acid | 16 | 2.2 | 0.20 | 0.21 | 20 |
| 17 | Example 2 | 25 | 8.5 | 330 | 1.5 | 45 | Oleic acid | 16 | 3.5 | 0.23 | 0.20 | 30 |
| 18 | Example 3 | 25 | 8.5 | 330 | 1.5 | 35 | Silicone oil | <−20 | 3.0 | 0.20 | 0.20 | 25 |
| 19 | Example 3 | 25 | 8.5 | 330 | 1.5 | 35 | Liquid paraffin | −18 | 3.0 | 0.20 | 0.20 | 25 |
| 20 | Example 3 | 25 | 8.5 | 330 | 1.5 | 35 | Linoleic acid | −5 | 3.0 | 0.20 | 0.20 | 25 |
| 21 | Example 3 | 25 | 8.5 | 330 | 1.5 | 35 | Methyl laurate | 5 | 3.0 | 0.20 | 0.21 | 25 |
| 22 | Example 3 | 25 | 8.5 | 330 | 1.5 | 35 | Oleic acid monoglyceride | 18 | 3.0 | 0.20 | 0.22 | 25 |
| 23 | Example 3 | 25 | 8.5 | 330 | 1.5 | 35 | Lauryl alcohol | 26 | 3.0 | 0.20 | 0.23 | 25 |
| 24 | Example 3 | 25 | 8.5 | 330 | 1.5 | 35 | Butyl stearate | 28 | 3.0 | 0.20 | 0.25 | 25 |
| 25 | Example 3 | 25 | 8.5 | 330 | 1.5 | 35 | Ethyl stearate | 33 | 3.0 | 0.20 | 0.28 | 24 |
| 26 | Comparative Example 3 | 25 | 8.5 | 330 | 1.5 | 35 | Myristic acid modified silicon | 45 | 3.0 | 0.20 | 0.40 | 21 |
| 27 | Comparative Example 3 | 25 | 8.5 | 330 | 1.5 | 35 | Paraffin | 57 | 3.0 | 0.20 | 0.45 | 20 |
| 28 | Comparative Example 3 | 25 | 8.5 | 330 | 1.5 | 35 | Behenic acid | 82 | 3.0 | 0.20 | 0.5< | 20 |
| 29 | Comparative Example 3 | 25 | 8.5 | 330 | 1.5 | 35 | Lauric amide | 110 | 3.0 | 0.20 | 0.5< | 20 |

*measured by BET method

It is clear from Table 1 that Samples Nos. 1, 7 to 11 in accordance with this invention show excellent characteristics with regard to the video S/N ratio and coefficient of friction (before and after running). That is, the video S/N ratio is higher and the coefficient of friction is lower before and after running. It should be noted that the coefficient of friction hardly increased even after tapes were required to make as many as 1500 passes. When the fine carbon black and coarse carbon black are mixed, the porosity of the magnetic layer is higher, and correspondingly the increase of the coefficient of friction caused by running the tape in a VTR is restrainted.

Better results can be obtained where the mixing ratio of the fine carbon black to the coarse carbon black is 97/3 to 50/50. If the fine carbon black is present in an amount beyond the above ratio, the coefficient of friction increases, and if the coarse carbon black is present in an amount beyond this ratio the video S/N ratio is deteriorated.

Sample No. 13 is a mixture of two kinds of carbon black. This comparative sample has unsatisfactory properties in coefficient of friction and video S/N ratio, and therefore is inferior to the present invention.

With regard to the lubricant of Sample Nos. 1, 18 to 29, in which the liquid lubricatn is used, the coefficient of friction is low and does not change after being run in a VTR (Sample Nos. 1 and 18 to 25). When a solid lubricant is used, although the coefficient of friction is low before the tape is run, it markedly increases after the tape has been run. This is an unfavorable feature (Sample Nos. 26 to 29).

When Samples Nos. 1 and 14 to 17 are compared with regard to the BET surface area of the ferromagnetic particles and other characteristics, samples having a surface area of not less than 30 m²/g were found to have excellent video S/N ratios.

While the invention has been described in detail and with reference to specific embodiment thereof, it will be apparent to one skilled in the art that various changes and modifications can be made therein without departing from the spirit and scope thereof.

What is claimed is:

1. A magnetic recording medium, having improved running durability, an improved S/N ratio and an improved coefficient of friction comprising:
    a non-magnetic support having provided thereon;
    a magnetic layer, wherein the magnetic layer is comprised of:
    (1) a carbon black having an average primary particle size of smaller than 50 mµ;
    (2) a carbon black having an average primary particle size of larger than 150 mµ wherein the weight ratio of (1)/(2) is within the range of 60/40 to 90/10;
    (3) a lubricant which is in a liquid state at normal temperature;
    ferromagnetic particles; and
    a binder.

2. A magnetic recording medium as claimed in claim 1, wherein the carbon black (2) has an average primary particle size within the range of 200 to 1,000 mµ.

3. A magnetic recording medium as claimed in claim 1, wherein the ferromagnetic particles have a surface area measured by BET method of not smaller than 30 m²/g.

4. A magnetic recording medium as claimed in claim 3, wherein the ferromagnetic particles have a surface area measured by BET method of not smaller than 35 m²/g.

5. A magnetic recording medium as claimed in claim 1, wherein the carbon black (1) has an average primary particle size within the range of 5 to 35 mµ.

6. A magnetic recording medium as claimed in claim 5, wherein the carbon black (1) has an average primary 7. A magnetic recording medium as claimed in claim 1, wherein the carbon blacks (1) and (2) are present in a total amount of 1 to 20 parts by weight per 100 parts by weight of the ferromagnetic particles.

8. A magnetic recording medium as claimed in claim 7, wherein the carbon blacks (1) and (2) are present in a total amount of 3 to 15 parts by weight per 100 parts by weight of the ferromagnetic particles.

9. A magnetic recording medium as claimed in claim 1, wherein the lubricant is present in an amount of 10 to 1000 parts by weight per 100 parts by weight of the carbon black (2).

10. A magnetic recording medium as claimed in claim 9, wherein the lubricant is present in an amount within the range of 20 to 750 parts by weight per 100 parts by weight of the carbon black (2).

11. A magnetic recording medium as claimed in claim 10, wherein the lubricant is present in an amount within the range of 50 to 500 parts by weight per 100 parts by weight of the carbon black (2).

12. A magnetic recording medium as claimed in claim 1, wherein the carbon black (1) has an average primary particle size within the range of 5 to 30 mµ, the carbon black (2) has an average primary particle size within the range of 200 to 1000 mµ, the weight ratio of carbon blacks (1)/(2) is within the range of 60/40 to 90/10, carbon blacks (1) and (2) are present in a total amount of 1 to 20 parts by weight per 100 parts by weight of the ferromagnetic particles, and wherein the lubricant is present in an amount of 10 to 1000 parts by weight per 100 parts by weight of carbon black (2).

13. A magnetic recording medium as claimed in claim 12, wherein said lubricant is selected from the group consisting of silicon oils, liquid paraffins, fatty acids, fatty acid esters and fluorine-containing oils.

14. A magnetic recording medium as claimed in claim 13, wherein said binder is selected from the group consisting of cellulose derivatives, vinyl chloride-vinyl acetate resins, polyurethanes, epoxy resins, polyamides, polyisocyanates or polyesters.

15. A magnetic recording medium as claimed in claim 1, wherein the carbon black (1) has an average primary particle size within the range of 10 to 30 mµ, the carbon black (2) has an average primary particle size within the range of 200 to 1000 mµ, the weight ratio of carbon blacks (1)/(2) is within the range of 60/40 to 90/10, carbon blacks (1) and (2) are present in a total amount of 3 to 15 parts by weight per 100 parts by weight of the ferromagnetic particles, and wherein the lubricant is present in an amount of 20 to 750 parts by weight per 100 parts by weight of carbon black (2).

16. A magnetic recording medium as claimed in claim 15, wherein said lubricant is selected from the group consisting of silicon oils, liquid paraffins, fatty acids, fatty acid esters and fluorine-containing oils.

17. A magnetic recording medium as claimed in claim 16, wherein said binder is selected from the group consisting of cellulose derivatives, vinyl chloride-vinyl acetate resins, polyurethanes, epoxy resins, polyamides, polyisocyanates or polyesters.

* * * * *